(No Model.)
M. A. MILLS.
PUMP VALVE.
No. 581,469. Patented Apr. 27, 1897.
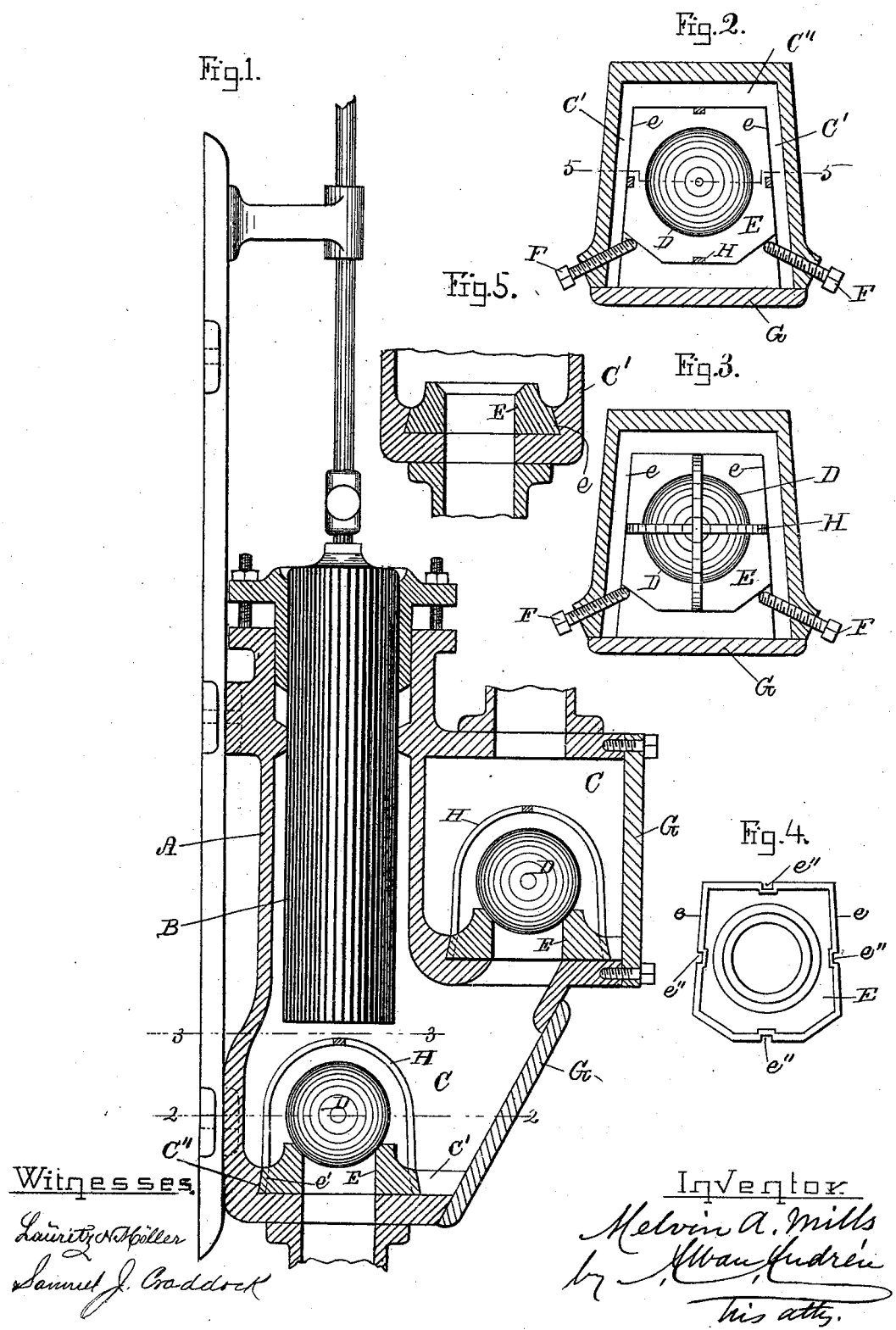

UNITED STATES PATENT OFFICE.

MELVIN A. MILLS, OF LAWRENCE, MASSACHUSETTS.

PUMP-VALVE.

SPECIFICATION forming part of Letters Patent No. 581,469, dated April 27, 1897.

Application filed June 11, 1896. Serial No. 595,159. (No model.)

*To all whom it may concern:*

Be it known that I, MELVIN A. MILLS, a citizen of the United States, and a resident of Lawrence, in the county of Essex and State of Massachusetts, have invented new and useful Improvements in Pump-Valves, of which the following, taken in connection with the accompanying drawings, is a specification.

This invention relates to improvements in pump-valves; and it has for its object to permit the easy access to and removal of the valve, if desired, to be cleansed, reseated, or repaired, as will hereinafter be more fully shown and described, reference being had to the accompanying drawings, wherein—

Figure 1 represents a central longitudinal section of a pump provided with my improved valves. Fig. 2 represents a cross-section on the line 2 2 in Fig. 1, showing the ball-valve in elevation. Fig. 3 represents a similar cross-section on the line 3 3 shown in Fig. 1. Fig. 4 represents a detail top plan view of the valve-seat, and Fig. 5 represents a cross-section on the line 5 5 shown in Fig. 2.

Similar letters refer to similar parts wherever they occur on the different parts of the drawings.

In Fig. 1, A represents a pump-cylinder, as usual, in which is movable the piston or plunger B, as shown. In one piece with the cylinder A or suitably connected thereto are the valve shells or chambers C C, as is common in devices of this kind.

D D represent the valves, shown in the drawings as ball-valves, but any other form of valves may be used without departing from the essence of my invention.

E E are the detachable perforated valve-seats for the valves D D. Each such valve-seat is supported on the bottom of its valve-chamber and is constructed with tapering beveled sides $e$ $e$, adapted to be guided and held in corresponding tapering beveled ways C' C' on the interior of the valve-chambers, as shown in the drawings.

In practice I prefer to make the rear end $e'$ of the seat E also beveled and fitting against a correspondingly-beveled surface C'' in the valve-chamber, as shown in the drawings.

The valve-seat is held against its inclined beveled guides by means of adjustable regulating-screws F F, screwed through the sides of the valve-shells and having their inner ends pressing against the forward portion of said valve-seat, as shown in Figs. 2 and 3.

G G are removable covers secured in a suitable manner to the open ends of the valve-chambers, as shown in Figs. 1, 2, and 3.

For the purpose of preventing the valves from being raised too far above their seats during the pumping operation I secure to such seats the curved bails H H, preferably cruciform, as shown in Figs. 1, 2, and 3, their lower ends being received and held in position in notches or recesses $e''$ $e''$ in the edges of the said seats, as shown.

If at any time it is required to remove one of the valve-seats for any cause whatever, it is only necessary to detach the cover G and loosen the screws F F, after which the valve-seat may easily be drawn outward and removed from its valve-chamber, as may be needed, for cleansing, repairing, or reseating purposes, after which the valve-seat is replaced in position within its tapering beveled guides and firmly held in its proper position by setting up the holding-screws F F, as shown in Figs. 2 and 3, after which the cover G is put in position to close the valve-chamber opening, as fully shown in Figs. 1, 2, and 3. By this arrangement easy access may at any desired time be had to the valves and their valve-seats.

Having thus fully described the nature, construction, and operation of my invention, I wish to secure by Letters Patent and claim—

In a pump a valve-chamber having tapering beveled guides and a correspondingly-shaped valve-seat and means for holding the latter in position relative to its guides combined with arched valve-stops H, H, having their lower ends received in notches or recesses in the edges of the valve-seat, substantially as and for the purpose set forth.

In testimony whereof I have signed my name to this specification, in the presence of two subscribing witnesses, on this 9th day of June, A. D. 1896.

MELVIN A. MILLS.

Witnesses:
WILBUR E. ROWELL,
GEORGE C. CORLESS.